United States Patent
Kojima et al.

(10) Patent No.: US 8,125,321 B2
(45) Date of Patent: Feb. 28, 2012

(54) OBSTACLE DETECTING DEVICE

(75) Inventors: Kiyonari Kojima, Nishikamo-gun (JP); Toshihiro Hattori, Okazaki (JP); Akio Nakano, Anzyo (JP)

(73) Assignees: Denso Corporation, Karia, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 1182 days.

(21) Appl. No.: 11/905,755

(22) Filed: Oct. 3, 2007

(65) Prior Publication Data

US 2008/0089177 A1 Apr. 17, 2008

(30) Foreign Application Priority Data

Oct. 5, 2006 (JP) .................. 2006-274416

(51) Int. Cl.
*B60Q 1/00* (2006.01)
*G08B 23/00* (2006.01)
*G01S 15/00* (2006.01)

(52) U.S. Cl. .............. 340/435; 340/943; 340/693.5; 340/693.6; 340/693.9; 340/693.11; 340/693.12; 367/93; 367/909

(58) Field of Classification Search .......... None
See application file for complete search history.

(56) References Cited

U.S. PATENT DOCUMENTS

| | | | | |
|---|---|---|---|---|
| 5,644,093 A | * | 7/1997 | Wright et al. | 73/866.5 |
| 6,114,950 A | * | 9/2000 | Schaible et al. | 340/435 |
| 6,282,969 B1 | * | 9/2001 | Daniel | 73/866.1 |
| 7,240,555 B2 | * | 7/2007 | Kawashima | 73/632 |
| 2002/0130770 A1 | * | 9/2002 | Keyworth et al. | 340/436 |
| 2006/0022844 A1 | * | 2/2006 | Kawashima | 340/943 |

FOREIGN PATENT DOCUMENTS

| | | |
|---|---|---|
| DE | 103 47 098 | 5/2005 |
| DE | 10 2006 038 5 | 5/2008 |
| GB | 2279745 | 1/1995 |
| JP | S59-166599 | 11/1984 |
| JP | S61-198154 | 12/1986 |
| JP | S63-181878 | 11/1988 |
| JP | 5-248935 | 9/1993 |
| JP | 10-123236 | 5/1998 |
| JP | 2002-315096 | 10/2002 |
| JP | 2004-264264 | 9/2004 |
| JP | 2004-297219 | 10/2004 |

OTHER PUBLICATIONS

German Office Action dated Oct. 28, 2009, issued in corresponding German Application No. 10 2007 045 809.8-55, with English translation.

(Continued)

*Primary Examiner* — Julie Lieu
(74) *Attorney, Agent, or Firm* — Nixon & Vanderhye PC

(57) ABSTRACT

An obstacle detecting device includes a wall member and an ultrasonic sensor. The wall member has a base member having an inner surface, and the base member extends in parallel with an imaginary plane. The ultrasonic sensor is attached to the inner surface of the base member for transmitting and receiving an ultrasonic wave via the base member. The ultrasonic sensor includes an ultrasonic transducer, and is in contact with the base member via a contact portion of the inner surface of the base member. The wall member includes a plurality of rigidity changing portions that are arranged on an other part of the inner surface other than the contact portion in an arrangement direction away from the contact portion.

37 Claims, 9 Drawing Sheets

OTHER PUBLICATIONS

Japanese Office Action dated Jun. 7, 2011, issued in corresponding Japanese Application No. 2006-274416, with English translation.

Japanese Office Action dated Sep. 13, 2011, issued in corresponding Japanese Application No. 2006-274416, with English translation.

* cited by examiner

MAX DISPLACEMENT
VIBRATION MODE

MIN. DISPLACEMENT
VIBRATION MODE

OBSTACLE DETECTING DEVICE

CROSS REFERENCE TO RELATED APPLICATION

This application is based on and incorporates herein by reference Japanese Patent Application No. 2006-274416 filed on Oct. 5, 2006.

BACKGROUND OF THE INVENTION

1. Field of the Invention

The present invention relates to an obstacle detecting device in which an ultrasonic sensor including an ultrasonic transducer is attached to a wall member and which sends and/or receives ultrasonic waves via the wall member.

2. Description of Related Art

Obstacle detecting devices are known which detect obstacles around a vehicle using an ultrasonic sensor, for example. For example, in the obstacle detecting device having an ultrasonic sensor that is disclosed in JP-A-2004-264264, a hole is formed in a bumper of a vehicle and the head portion of the ultrasonic sensor is exposed through the hole so as to be flush with the outer surface of the bumper. However, since the head portion of the ultrasonic sensor is exposed to outside the vehicle, the obstacle detecting device having such a structure is not preferable in terms of design.

For example, the obstacle detecting device of JP-A-10-123236 has been proposed as a countermeasure against the above disadvantage. That is, the design performance is improved by providing a recess on the back side of a bumper of a vehicle and housing an ultrasonic vibration type sensor in the recess so that the sensor is unseen from the outside.

Incidentally, in the obstacle detecting device of JP-A-10-123236, an ultrasonic sensor in which a disc-shaped ceramic member (ultrasonic transducer) is laid on a metal base so as to form an integral lamination member is attached to the bottom wall of a recess that is larger than the ceramic member in a plane that is parallel with the bumper in such a manner that the outer surface of the ceramic member is in direct contact with the bottom wall of the recess. Therefore, vibration (what is called unwanted vibration) tends to be transmitted to around the portion of the bumper that is in contact with the ultrasonic sensor (ceramic member), in which case vibration occurs in a wide range of the bumper to cause irregular directivity. This is considered due to a phenomenon that the wide-range vibration produces different phases at individual positions and thereby causes interference.

SUMMARY

The present invention is made in view of the above disadvantages. Thus, it is an objective of the present invention to address at least one of the above disadvantages.

In an exemplary embodiment, there is provided an obstacle detecting device, which includes a wall member and an ultrasonic sensor. The wall member has a base member having an inner surface, and the base member extends in parallel with an imaginary plane. The ultrasonic sensor is attached to the inner surface of the base member for transmitting and receiving an ultrasonic wave via the base member. The ultrasonic sensor includes an ultrasonic transducer, and is in contact with the base member via a contact portion of the inner surface of the base member. The wall member includes a plurality of rigidity changing portions that are arranged on an other part of the inner surface other than the contact portion in an arrangement direction away from the contact portion.

In an exemplary embodiment, there is also provided an obstacle detecting device, which includes a wall member and an ultrasonic sensor. The wall member has a base member having an inner surface, and the base member extends in parallel with an imaginary plane. The ultrasonic sensor is attached to the inner surface of the base member for transmitting and receiving an ultrasonic wave via the base member, and the ultrasonic sensor has a vibratory portion that is in contact with a contact portion of the inner surface of the base member. The wall member includes a plurality of rigidity changing portions that are arranged on an other part of the inner surface other than the contact portion in an arrangement direction away from the contact portion.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Embodiments of the present invention will be hereinafter described with reference to the drawings.

First Embodiment

Figure 1A:
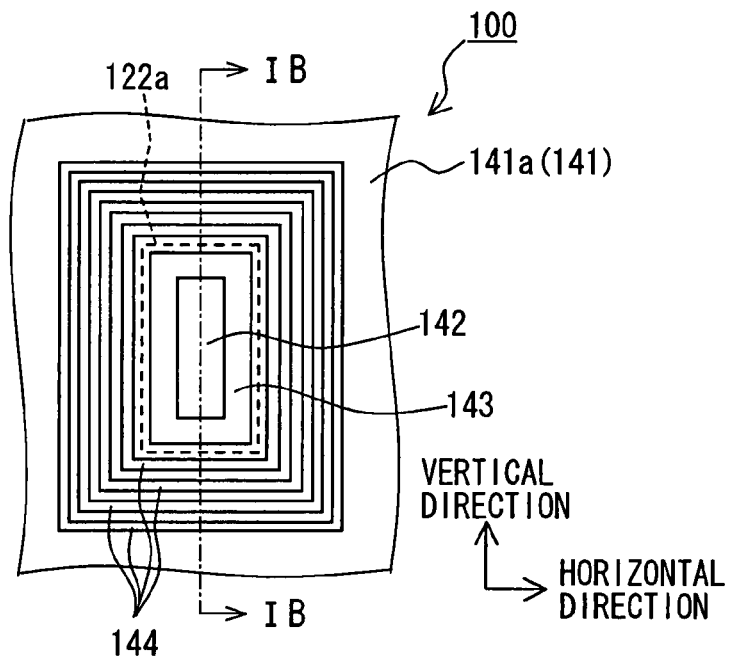
FIG. 1A is a plan view showing a general configuration of an obstacle detecting device according to a first embodiment of the present invention as viewed from inside.
Figure 1B:
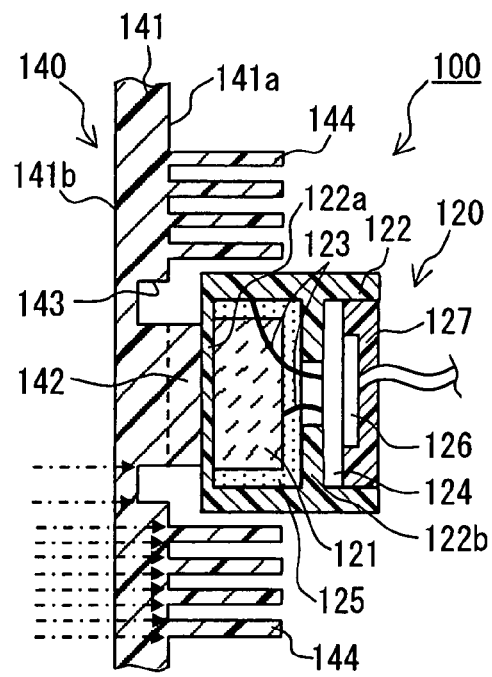
FIG. 1B is a sectional view taken along line IB-IB in FIG. 1A.

In FIG. 1A, for the sake of convenience, only the outer periphery of the outer surface of a bottom portion of a case of an ultrasonic sensor is indicated by a broken line. In FIG. 1B, for the sake of convenience, rigidity changing points of a wall member that are located on only one side of its portion that is in contact with the ultrasonic sensor are indicated by chain-line arrows.

As shown in FIG. 1B, in an obstacle detecting device 100 according to the present embodiment, an ultrasonic sensor 120 is attached to an inner surface 141a of a wall member 140. The obstacle detecting device 100 thus includes part of the wall member 140 as a vibration transmission path. The ultrasonic sensor 120 includes, as main components, an ultrasonic transducer 121 which sends ultrasonic waves and/or receives ultrasonic waves reflected from an obstacle and a case 122 which houses the ultrasonic transducer 121.

The ultrasonic transducer 121 may be a piezoelectric transducer which is a sintered body of piezoelectric ceramics such as PZT or barium titanate. In this embodiment, the ultrasonic transducer 121 is a piezoelectric transducer made of PZT which, when receiving a drive signal, is strained by dielectric polarization and vibrated in the longitudinal direction (thickness direction) to generate ultrasonic waves. In this embodiment, the single ultrasonic transducer 121 both sends and receives ultrasonic waves.

Electrodes (not shown) are formed on faces of the ultrasonic transducer 121 and leads 123 are electrically connected to the electrodes. In this embodiment, as shown in FIG. 1B, one lead 123 is connected to an inner surface of the case 122 that is electrically connected to the corresponding electrode. The leads 123 are electrically connected to a circuit board 124 on which a processing circuit is formed which outputs a drive signal for causing the ultrasonic transducer 121 to vibrate and generate ultrasonic waves and which receives a voltage signal that is generated in the ultrasonic transducer 121 being strained through the piezoelectric effect when ultrasonic waves are transmitted to the ultrasonic transducer 121. That is, the obstacle detecting device 100 including the ultrasonic sensor 120 can calculate a distance to an obstacle around the vehicle and its direction on the basis of a time from sending to and reception of ultrasonic waves, a phase difference between reception signals, etc.

The case 122, which houses the single ultrasonic transducer 121, is made of, for example, aluminum and a synthetic resin (in this embodiment, the inner surfaces of a synthetic resin cylinder are coated with a metal) and has a tubular shape with a bottom. As shown in FIG. 1B, the ultrasonic transducer 121 is placed on (e.g., bonded and fixed to) the inner surface of a bottom portion 122a. That is, the bottom portion 122a on which the ultrasonic transducer 121 is placed serves as a vibration plate (i.e., diaphragm), and the outer surface of the bottom portion 122a serves as a vibratory surface (i.e., vibratory portion of the ultrasonic sensor). In this embodiment, as indicated by the broken line in FIG. 1A, the outer surface of the bottom portion 122a as the vibratory surface has a rectangular shape that is longer in the vertical direction (with respect to the ground) than in the horizontal direction in a plane that is parallel with the wall member 140 (generally perpendicular to the ground in the present embodiment). In the present embodiment, for example, the plane parallel with the wall member 140 is an imaginary plane, with which the base member 141 of the wall member 140 extends in parallel. However, in this embodiment, the wall member 140 is provided with a projecting ultrasonic wave transmission portion 142 (described later in detail) for determining the directivity. In the configuration with the ultrasonic wave transmission portion 142, no particular restrictions are imposed on the shape of the outer surface of the bottom portion 122a in determining the directivity.

In the case 122, as shown in FIG. 1B, a sound absorbing member 125 is provided around the ultrasonic transducer 121 except its portion that is in contact with the inner surface of the bottom portion 122a. The sound absorbing member 125 serves to absorb unwanted ultrasonic waves that are emitted into the case 122 when the ultrasonic transducer 121 is expanded and contracted and the bottom portion 122a of the case 122 is thereby vibrated, and is made of a material that is superior in sound absorption performance such as silicone sponge. Reference symbol 122b in FIG. 1B denotes a stopper which is provided inside the case 122 to fix the sound absorbing member 125 and the circuit board 124. Reference symbol 126 denotes a connector which connects the circuit board 124 to the outside (e.g., a control section which is provided inside the passenger compartment and performs an alarm processing control, a running control, etc.). Reference symbol 127 denotes a sealing member which seals the case 122 airtightly.

In the ultrasonic sensor 120 of this embodiment, since as described above the case 122 is sealed airtightly, the ultrasonic transducer 121 is not exposed to the external air and the leads 123 etc. are prevented from being corroded. A structure for fixing the ultrasonic sensor 120 to the inner surface 141a of the wall member 140 may be employed as long as it does not appear from the external surface 141b of the wall member 140. In this embodiment, as an exemplary fixing structure, the outer surface of the bottom portion 122a is bonded and fixed to the inner surface 141a of the wall member 140.

No particular limitations are imposed on the wall member 140 except that it should be suitable for transmission of ultrasonic waves (vibration) in terms of the material and the thickness. In this embodiment, the wall member 140 is a bumper of a vehicle. That is, the obstacle detecting device 100 according to this embodiment is configured as a vehicular obstacle detecting device for detecting obstacles around the vehicle. Bumpers are usually synthetic resin molded members made of urethane, polypropylene, or the like. Where the obstacle detecting device 100 is a vehicular obstacle detecting device, the wall member 140 may be a metal plate that is a component of a vehicle body, for example.

The inner surface 141a of a base member 141 (made of a synthetic resin) of the wall member 140 is provided with the projecting ultrasonic wave transmission portion 142 (the broken line shown in FIG. 1B indicates a boundary between the base member 141 and the ultrasonic wave transmission portion 142) in such a manner that it corresponds to the vibratory portion (i.e., the outer surface of the bottom portion 122a of the case 122) of the ultrasonic sensor 120. That is, ultrasonic waves (vibration) are transmitted between the ultrasonic sensor 120 (i.e., the ultrasonic transducer 121 and the bottom portion 122a of the case 122) and the wall member 140 via the ultrasonic wave transmission portion 142.

The ultrasonic wave transmission portion 142 is a column-shaped portion which projects from the inner surface 141a of the base member 141. And the contact surface of the ultrasonic wave transmission portion 142 and the outer surface of the bottom portion 122a of the case 122 are made different from each other in at least one of the shape and the area in the plane parallel with the wall member 140. That is, the ultrasonic wave transmission portion 142 is formed so as to narrow, into a predetermined range, the major transmission range of ultrasonic waves (vibration) that are transmitted between the ultrasonic sensor 120 and the wall member 140. As shown in FIG. 1A, the ultrasonic wave transmission portion 142 of this embodiment is configured so as to have a rectangular contact surface that is larger in length in the vertical direction than in the horizontal direction and that is smaller in area than and is entirely included in the outer surface of the bottom portion 122a. The contact surface of the ultrasonic wave transmission portion 142 is approximately the same in shape as the outer surface of the bottom portion 122a. The ultrasonic wave transmission portion 142 is formed integrally with the wall member 140 by using the same material (integral molding or forming).

The inner surface 141a of the base member 141 excluding the surface that is formed with the ultrasonic wave transmission portion 142 is provided with plural rigidity changing portions for causing the rigidity of the associated portion of the wall member 140 to be different from that of the inside portion. Here, the inside portion is the portion located on the side of the associated portion (rigidity changing portion) toward the contact portion. The plural rigidity changing portions are arranged in a direction (arrangement direction) away from the contact portion (i.e., any one direction in which vibration is transmitted away from the contact portion). In a case, where the rigidity changing portions, which are the associated portion different in rigidity from the nearby portions, are provided in the above manner, the higher-rigidity portion is less apt to vibrate due to the rigidity difference. Therefore, in the wall member 140, vibration (unwanted vibration) that is transmitted outward past the rigidity changing portions can be weakened. In particular, unwanted vibration can be attenuated effectively by arranging the plural rigidity changing portions in directions in which the distance from the contact portion increases. In this embodiment, the plural rigidity changing portions include a groove 143 and projections 144.

The rigidity changing portions may be provided at any positions on the inner surface 141a of the base member 141 except the portion (referred to as "contact portion") that is formed with the ultrasonic wave transmission portion 142. It is preferable that at least one of the plural rigidity changing portions be in ring form so as to surround the contact portion. This structure can effectively attenuate unwanted vibration that spreads radially outwardly from the contact portion because no escape paths are left. It is even preferable that at least one of the plural rigidity changing portions be in ring form so as to extend along (to be parallel with) the outer periphery of the contact portion. This structure makes it easier to secure directivity that reflects the shape of the contact portion (i.e., the shape of the ultrasonic wave transmission portion 142) because the interval between the contact portion and the at least one rigidity changing portion is uniform. It is even preferable that the closest one of the plural rigidity changing portions closest to the contact portion be in ring form. The energy of unwanted vibration is higher and the attenuation effect of the rigidity changing portion is higher when it is closer to the contact portion. Therefore, this structure can narrow the major transmission range of ultrasonic waves (vibration) in the wall member 140. It is most preferable that the closest one of the rigidity changing portions be formed adjacent to the outer periphery of the contact portion. This structure can narrow the major transmission range more effectively.

The groove 143 may be either formed at the time of formation of the base member 141 of the wall member 140 or formed by working the base member 141 formed. In this embodiment, the groove 143 is formed at the same time as the base member 141 is formed which is made of a resin.

Figure 2:
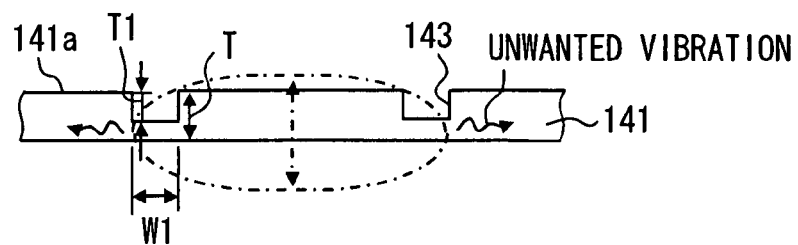
FIG. 2 is a schematic diagram illustrating how unwanted vibration is attenuated by a groove.

Since the bottom wall of the groove 143 of the wall member 140 (base member 141) is lower in rigidity than the portions around the groove 143, the former is easier to deform than the latter. For example, where as shown in FIG. 2 the groove 143 is formed so as to surround the portion of the base member 141 that includes its contact portion in the plane parallel with the wall member 140, since the rigidity is higher in the portion outside the groove 143 than in the bottom wall of the groove 143, a node is formed at the groove 143 when ultrasonic waves are sent or received. And the portion surrounded by the groove 143 is apt to vibrate (i.e., the energy consumed by vibration increases). Therefore, the amplitude of vibration of the portion of the base member 141 that is surrounded by the groove 143 is increased (e.g., as indicated by a chain line in FIG. 2), as a result of which the energy of unwanted vibration that is transmitted to outside the groove 143 is decreased. This is one explanation of the attenuation of unwanted vibration. On the other hand, since the rigidity is higher in the portion outside the groove 143 (i.e., on a side of the groove 143 in the direction away from the contact portion) than in the bottom wall of the groove 143, unwanted vibration is less apt to be transmitted to outside the groove 143 and part of the energy of the unwanted vibration is reflected. Therefore, the energy of unwanted vibration is increased in the portion of the base member 141 that includes the groove 143 and the contact portion, as a result of which the amplitude of vibration is increased there (e.g., as indicated by the chain line in FIG. 2). This is another explanation of the attenuation of unwanted vibration. In either case, providing the groove 143 makes it possible to narrow, into a predetermined range, the range of the portion of the wall member 140 that is apt to vibrate (i.e., the major ultrasonic wave (vibration) transmission range of the wall member 140) and to thereby secure desired directivity.

In this embodiment, as shown in FIG. 1B, the one ring-shaped groove 143 is provided in such a manner that its inside surface (inside rigidity changing point) is adjacent to the outer periphery of the contact portion. Furthermore, not only the inside surface that is adjacent to the outer periphery of the contact portion but also the outside surface (outside rigidity changing point), which is opposed to the inside surface, is made parallel with the outer periphery of the contact portion in the plane parallel with the wall member 140; that is, the groove 143 has a constant width. That is, the range of the portion that is apt to vibrate (this range is defined by the groove 143) is made as narrow as possible and is given the same shape as the outer periphery of the ultrasonic wave transmission portion 142.

In the structure in which the groove 143 surrounds the portion including the contact portion, it is considered that the portion including the groove 143 vibrates with the outside surface of the groove 143 as a boundary. Therefore, it is preferable that at least the outside surface of the groove 143 be given a predetermined shape that is suitable for intended directivity. For example, approximately the same advantages as obtained by this embodiment can be obtained even in the case where the inside surface of the groove 143 is given a circular shape and its outside surface is given a rectangular shape like the outer periphery of the ultrasonic wave transmission portion 142 in the plane parallel with the wall member 140.

The number of grooves 143 is not limited to one. The contact portion may be surrounded by plural ring-shaped grooves 143. However, as described above, the important feature of the groove 143 is to form a low-rigidity portion in the wall member 140 and to thereby define the range of a portion that is apt to vibrate. Therefore, if plural low-rigidity portions are provided, the range of the portion that is apt to vibrate may increase to render the directivity irregular, contrary to the intention. In view of this, it is preferable that the number of grooves 143 arranged in the direction away from the contact portion be set at one. Furthermore, because the ultrasonic wave transmission portion 142 is configured so that its contact surface is smaller in area than and is entirely included in the outer surface of the bottom portion 122a, the groove 143 can be formed more easily in the vicinity of the contact portion than the projections 144 are. It is therefore preferable to employ the groove 143 as the rigidity changing portion located adjacent to the outer periphery of the contact portion.

No particular limitations are imposed on the depth T1 and the width W1 of the groove 143. In the present embodiment, for example, the depth T1 is a length of the groove 143 in a direction perpendicular to the imaginary plane, and the width W1 is a length of the groove 143 in the direction away from the contact portion, which is not shown in FIG. 2. Referring to FIG. 2, as the depth T1 of the groove 143 increases with respect to the thickness T of the base member 141, the thickness of the bottom wall of the groove 143 and hence its rigidity decreases, that is, the bottom wall of the groove 143 becomes easier to deform. On the other hand, as the width W1 increases, the low-rigidity portion (i.e., the bottom wall of the groove 143) becomes wider and easier to deform. Therefore, to make the portion surrounded by the groove 143 more apt to vibrate, it is preferable that the depth T1 and the width W1 of the groove 143 be greater. However, on the other hand, it becomes more difficult to maintain sufficient structural strength of the wall member 140 as the depth T1 or the width W1 of the groove 143 becomes greater. Where the groove 143 is formed in the base member 141 by injection-molding a resin material, a sink is more prone to occur. Therefore, the depth T1 and the width W1 of the groove 143 should be set as appropriate taking into consideration of the above and of the balance between the degree of attenuation of unwanted vibration by the groove 143 and that by the other rigidity changing portions.

Figure 3:
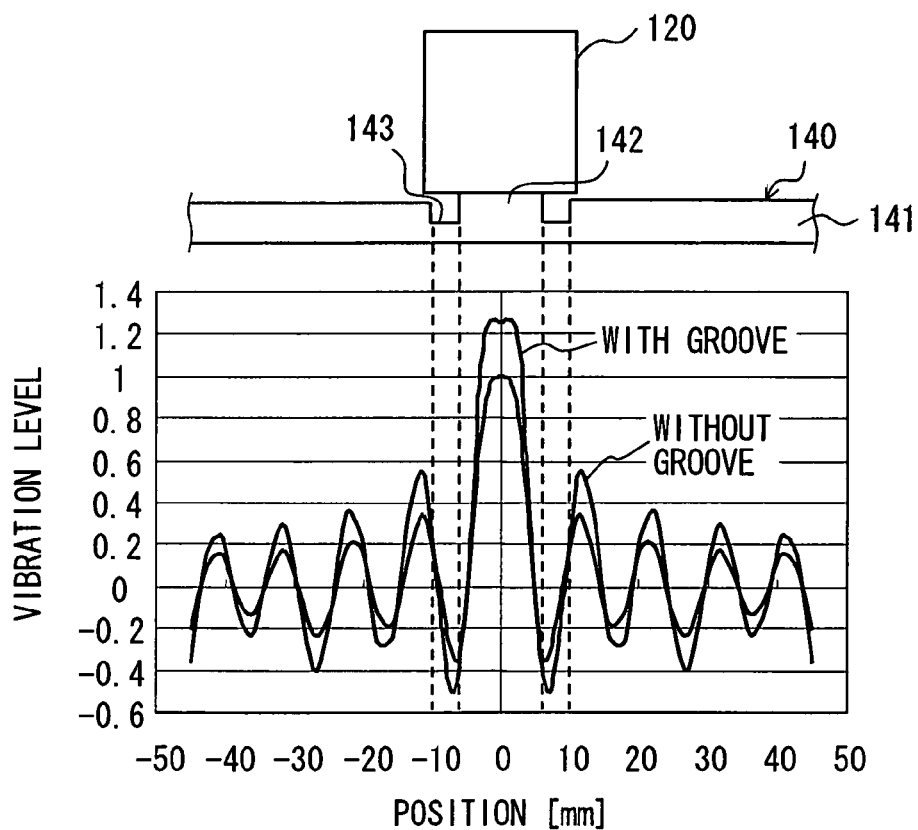
FIG. 3 shows the effect of the groove.

As shown in FIG. 3, the effect of the groove 143 of the configuration according to this embodiment has been confirmed by the present inventors. FIG. 3 shows vibration levels of a configuration with the groove 143 and of a comparative configuration without the groove 143 while the ultrasonic waves are sent and received. The vibration levels are normalized values, normalized by a vibration level at the contact portion of the comparative configuration. That is, the vibration level at the contact portion of the comparative configuration indicates the vibration level of "1". As shown in FIG. 3, by virtue of the presence of the groove 143, the vibration level of the contact portion (i.e., the portion surrounded by the groove 143) is increased by a factor of about 1.3. On the other hand, the vibration level of the portion outside the groove 143 is made lower than in the configuration without the groove 143. That is, the difference between the vibration levels of the contact portion and the portion outside the groove 143 is increased by providing the groove 143.

The projections 144 may be either formed at the same time as the base member 141 of the wall member 140 or fixed to the base member 141 after it is formed. And the projections 144 may be made of either the same material as or a different material than the base member 141. In this embodiment, the projections 144 are formed integrally with the base member 141 by using the same material. This makes it possible to simplify a manufacturing process.

Figure 4:
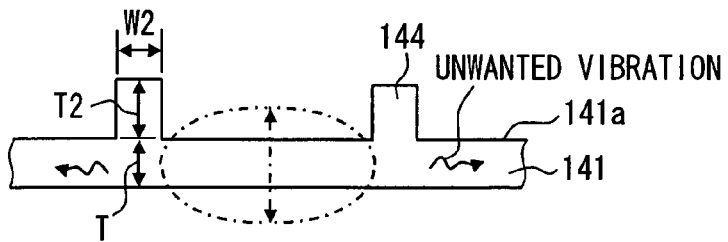
FIG. 4 is a schematic diagram illustrating how unwanted vibration is attenuated by a projection.

No particular limitations are imposed on the height T2 and the width W2 of the projections 144 (see FIG. 4). In the present embodiment, for example, the height T2 is a length of the projection 144 in a perpendicular direction to the imaginary plane, and the width W2 is a length of the projection 144 in the direction away from the contact portion. Since the rigidity of the portion of the wall member 140 (base member 141) where the projections 144 are provided is higher than at least the portions around the projections 144, the portion where the projections 144 are provided is less easy to deform than the other portions. For example, where as shown in FIG. 4 the projections 144 are provided so as to surround the portion of the base member 141 that includes the contact portion, the portion having the projections 144 serves as a high-rigidity binding portion during sending or receiving of ultrasonic waves. Spurious vibration is less prone to be transmitted to outside the projections 144 past the portion having the projections 144. Part of the energy of unwanted vibration is reflected by the projections 144, whereby the portion of the base member 141 that is surrounded by the projections 144 becomes more apt to vibrate with the projections 144 as a node (i.e., the energy consumed by the vibration increases). Referring to FIG. 4, the rigidity of the portion having the projections 144 increases as the height T2 of the projections 144 increases with respect to the thickness T of the base member 141. And the high-rigidity portion becomes wider and hence more difficult to deform as the width W2 increases. To enhance the binding effect, it is preferable that the width W2 and the height T2 of the projections 144 be greater.

However, as the total volume of the projections 144 increases, the probability of occurrence of a sink that is recognizable from the side of the external surface 141b of the wall member 140 increases. In view of this, this embodiment does not attenuate unwanted vibration by increasing the binding effect by a single large projection 144. Instead, plural projections 144 are provided side by side in a range where a single large projection 144 would be provided, whereby the rigidity is increased though it is lower than in the case where a single large projection 144 is provided. Furthermore, each projection 144 is configured so as to be deformed elastically when receiving unwanted vibration. That is, unwanted vibration is attenuated by the binding effect and the elastic deformation effect. More specifically, the binding effect decreases the energy of unwanted vibration that is transmitted away from the contact portion past the projections 144, whereby the amplitude of the vibration of the portion of the base member 141 surrounded by the projections 144 is increased as indicated by a chain line in FIG. 4, for example. The energy of unwanted vibration that is transmitted to the projections 144 is reduced by the elastic deformation effect. Spurious vibration can thus be attenuated effectively. As described above, providing the projections 144 also makes it possible to narrow, into a predetermined range, the range of the portion of the wall member 140 that is apt to vibrate (i.e., the major ultrasonic wave (vibration) transmission range of the wall member 140).

No particular limitations are imposed on the height T2 and the width W2 of the projections 144. The projections 144 exercise a considerable binding effect. The projections 144 can be rendered elastically deformable by setting the material, height T2, and width W2 of the projections 144 as appropriate. Where the projections 144 are elastically deformable, it is preferable that they resonate at the frequency λ of ultrasonic waves (vibration) (resonant length: n·λ/4 where n is a natural number). In this configuration, the projections 144 are deformed greatly when receiving unwanted vibration, whereby the unwanted vibration can be attenuated effectively. In this embodiment, a necessary resonant length (in this embodiment, λ/4) is secured by setting the height T2 of the projections 144 greater than or equal to the thickness T of the base member 141. This makes it possible to secure a necessary resonant length more easily and to thereby attenuate unwanted vibration efficiently. The heights T2 of all the plural projections 144 are set identical, whereby each projection 144 resonates with unwanted vibration having a predetermined frequency and the unwanted vibration can be attenuated efficiently. Furthermore, the width W2 is set smaller than or equal to the thickness T of the base member 141. This lowers the rigidity of the projections 144 themselves and thereby makes the projections 144 easier to deform during transmission of unwanted vibration. Furthermore, the probability of occurrence of a sink can be reduced and/or the degree of a sink can be lowered even if it occurs.

Figure 5A:
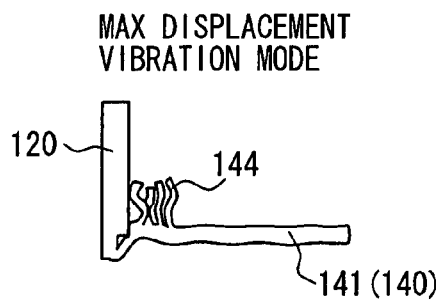
FIGS. 5A and 5B show FEM simulation results.
Figure 5B:
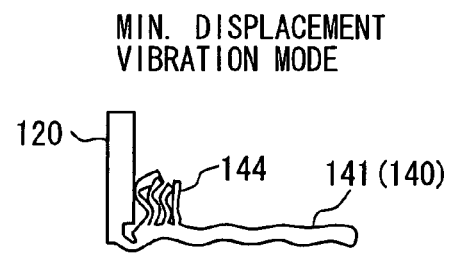

As shown in FIGS. 5A and 5B, the effect of elastic deformation of the projections 144 of this embodiment has been confirmed by a simulation by FEM (finite element method). A maximum displacement vibration mode shown in FIG. 5A and a minimum displacement (maximum speed) vibration mode shown in FIG. 5B are operated repeatedly during sending or reception of ultrasonic waves. It is apparent that the projections 144 are deformed elastically upon receiving unwanted vibration from the contact portion.

In this embodiment, four ring-shaped projections 144 are arranged side by side in the direction away from the contact portion so as to surround the contact portion and the groove 143. The widths W2 of the projections 144 are set constant and each projection 144 is shaped so as to be parallel with the outer periphery of the contact portion (ultrasonic wave transmission portion 142). Therefore, unwanted vibration that is transmitted to outside the contact portion can be attenuated reliably by the four projections 144 which are arranged side by side. Combined with the effect of the ultrasonic wave transmission portion 142 and the effect of the groove 143, the projections 144 make it possible to more easily secure desired directivity. In the configuration in which the projection 144 is provided so as to surround the portion including the contact portion, it is considered that the portion surrounded by the projection 144 vibrates with the inside surface (rigidity changing point) of the projection 144 as a node. It is therefore preferable that at least the inside surface of the projection 144 be given a predetermined shape that is suitable for intended directivity in the plane parallel with the wall member 140. For example, approximately the same advantages as obtained by the present embodiment can be obtained even in the case where the inside surface of the projection 144 has a rectangular shape in the imaginary plane similar to the outer periphery of the ultrasonic wave transmission portion 142, and the outside surface of the outermost projection 144 is given a circular shape. In this embodiment, not only the inside surface of the innermost projection 144 but also the outside surface of the projection 144 has a rectangular shape in the plane parallel with the wall member 140 so that the projection 144 has a constant width. Furthermore, because the inside surface of the projection 144 and the outside surface of the outermost projection 144 have approximately the same shape as the outer periphery of the outer surface of the bottom portion 122 of the ultrasonic sensor 120 in the plane parallel with the wall member 140, positioning of the ultrasonic sensor 120 is advantageously facilitated by using the projections 144 (in particular, the innermost one) as a mark when the ultrasonic sensor 120 is fixed to the wall member 140.

The number of projections 144 is not limited to four; it may be one or a plural number other than four. However, as described above, the important feature of the projections 144 is to define the range of a portion that is apt to vibrate by the binding effect or a combination of the binding effect and the elastic deformation effect. Therefore, if plural projections 144 are provided, at least the binding ability is increased and unwanted vibration can be attenuated more. Furthermore, if the projections 144 are made of a material that is different from the material of the base member 141 and that has a larger damping coefficient than the material of the base member 141, the projections 144 can attenuate unwanted vibration by absorbing vibration through their deformation.

Figure 6:
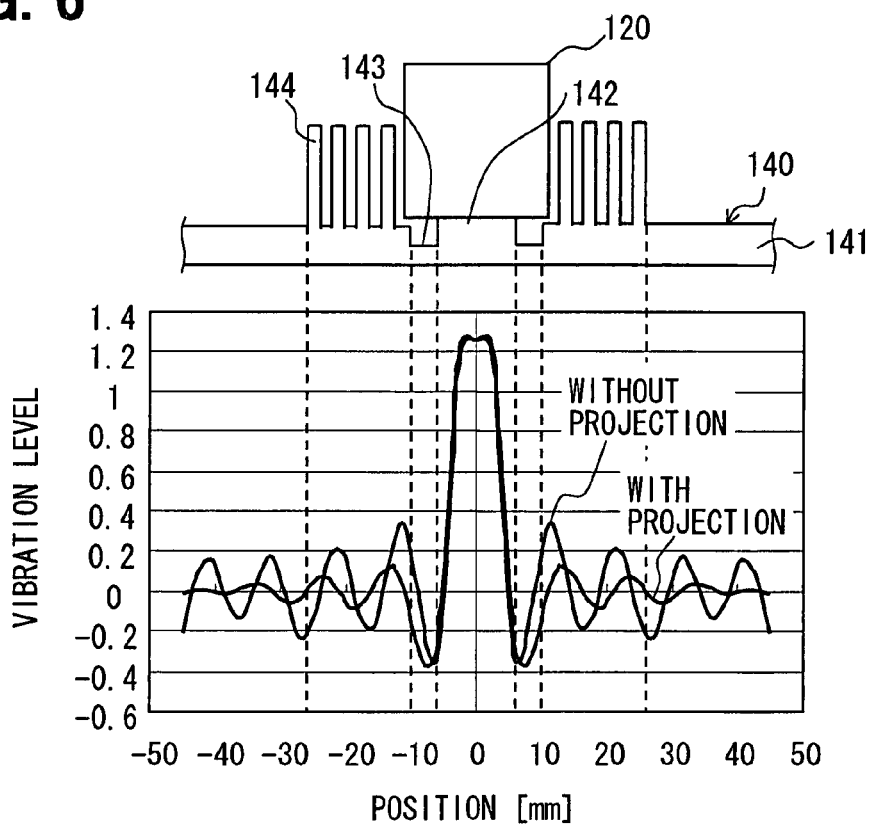
FIG. 6 shows the effect of projections.

As shown in FIG. 6, the effect of the projections 144 of this embodiment has been confirmed by the inventors. FIG. 6 shows vibration levels of an example configuration with the projections 144 and the groove 143 and of another comparative configuration only with the groove 143 (but without the projections 144). The example configuration is shown in FIG. 1B according to the present embodiment, and the another comparative configuration is similar to the configuration shown in FIG. 3. The vibration levels are normalized values normalized by the vibration level at the contact portion of the comparative configuration without the groove 143 and without the projections 144 described above with reference to FIG. 3. As shown in FIG. 6, by virtue of the presence of the projections 144 in addition to the groove 143, the vibration level of the portion outside the groove 143 is made lower than in the configuration that is provided with only the groove 143 (the projections 144 are not provided). In particular, the vibration level of the portion outside the projections 144 is made lower than in the configuration that is provided with only the groove 143 (the projections 144 are not provided). That is, the difference between the vibration levels of the contact portion and the portion outside the contact portion is increased by providing the projections 144.

As described above, in the obstacle detecting device 100 according to this embodiment, the ultrasonic sensor 120 is attached to the inner surface 141a of the wall member 140 and ultrasonic waves are sent and/or received via the wall member 140. The design performance can be improved because the ultrasonic sensor 120 is not seen from outside the wall member 140.

The rigidity of the portion having the rigidity changing portions of the wall member 140 is made different from the inside portion (the portion on the side of the contact portion) adjacent to it by providing the groove 143 and the projections 144 (rigidity changing portions) on the inner surface 141a of the wall member 140 excluding the surface that is formed with the ultrasonic wave transmission portion 142. Therefore, unwanted vibration that is transmitted away from the contact portion can be attenuated effectively by the plural rigidity changing portions. Because the unwanted vibration that is transmitted away from the contact portion is attenuated in the above manner, the interference due to phase-shifted ultrasonic waves that are sent from the periphery of the contact portion can be reduced while the waves are sent, for example. Furthermore, in a configuration in which plural ultrasonic sensors 120 are arranged side by side, the amounts of transmission of unwanted vibration to adjacent ultrasonic sensors 120 are reduced. Desired directivity can thus be secured.

The ultrasonic wave transmission portion 142 has a rectangular shape that is longer in the vertical direction than in the horizontal direction in the imaginary plane that is parallel with the wall member 140, and the groove 143 and the projections 144 also have the similar shape in the imaginary plane as the ultrasonic wave transmission portion 142. Therefore, the directivity of the obstacle detecting device 100 is strong (sharp) in the vertical direction and weak (not strong) in the horizontal direction, and hence is suitable for a vehicular obstacle detecting device.

In this embodiment, the rigidity changing portions are the groove 143 and the projections 144 which are different from the base member 141 in thickness. However, unwanted vibration can be reduced through one of the above-described effects by a portion that is different in rigidity from an adjacent inside portion in the directions in which the distance form the contact portion increases. That is, in the obstacle detecting device 100 according to this embodiment, not only the groove 143 and projections 144 are rigidity changing portions; more strictly, the portion of the base member 141 between the groove 143 and the projections 144 and the portions of the base member 141 between the projections 144 are also rigidity changing portions.

Figure 7:
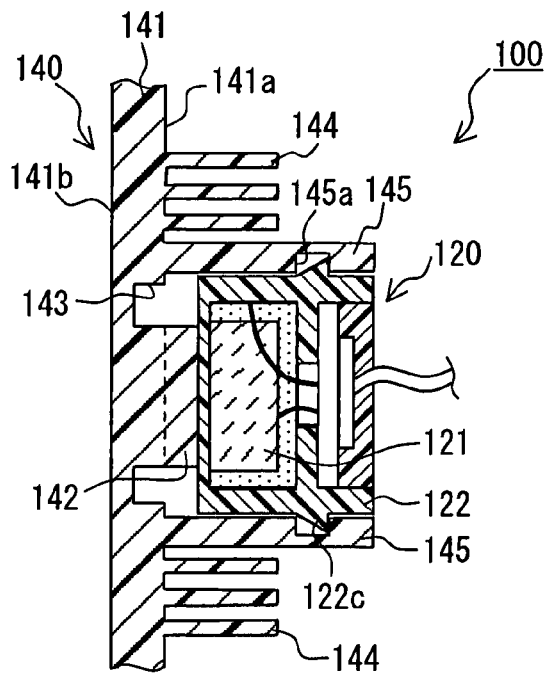
FIG. 7 is a sectional view showing a modification.

In this embodiment, the ultrasonic sensor 120 is bonded and fixed to the wall member 140. Alternatively, for example, as shown in FIG. 7, the ultrasonic sensor 120 may be fixed to the wall member 140 by using one of the projections 144 as a holder 145 for fixing the case 122 and fitting the holder 145 with a projection of the case 122. FIG. 7 is a sectional view showing the modification and corresponds to FIG. 1B. Reference numeral 122c in FIG. 7 denotes a fitting projection that is provided on the outer peripheral surface of the case 122, and reference numeral 145a denotes a fitting groove that is provided in the holder 145. This configuration makes it possible to increase the reliability of the connection of the ultrasonic sensor 120 to the wall member 140 while attenuating unwanted vibration. Both of the fixing by bonding and the fixing by fitting may be used. In the example of FIG. 7, the innermost (i.e., closest to the contact portion) projection 144 serves as the holder 145. However, another projection 144 may be used as a holder 145 by adjusting the heights of the projections 144 properly. Instead of fitting, the ultrasonic sensor 120 may be held between a plate-like member and the wall member 140 by pressing by disposing the plate-like member adjacent to the tip of a projection 144 and fixing it to the tip of the projection 144 and/or the case 122 by screwing, for example.

Figure 8:
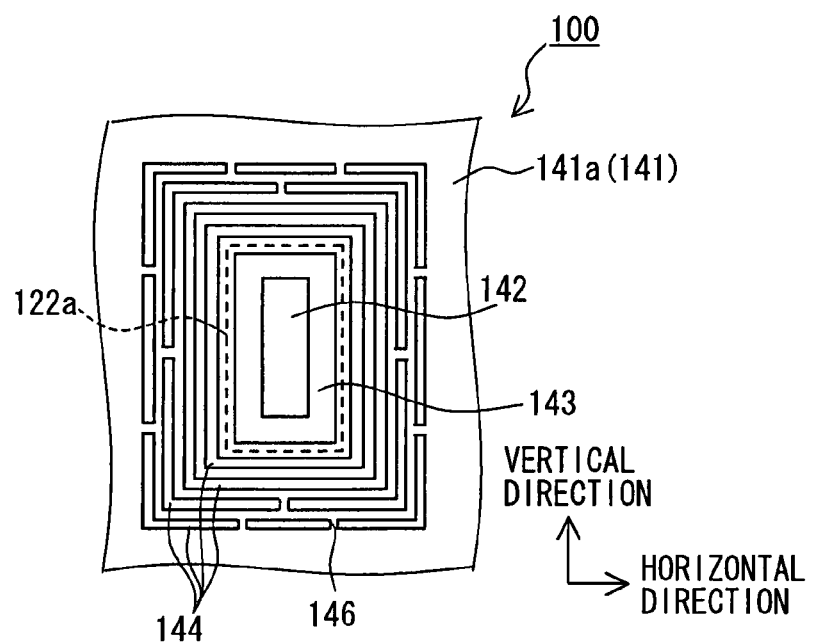
FIG. 8 is a plan view showing another modification.

In this embodiment, all the rigidity changing portions are shaped like a ring and are arranged concentrically around the contact portion. However, the shapes of the rigidity changing portions are not limited to a ring-like shape. For example, as shown in FIG. 8, each of part of the ring-like rigidity changing portions may be divided by slit-like dividing portions 146. Where dividing portions 146 are formed in plural rigidity changing portions, as shown in FIG. 8, it is preferable that the dividing portions 146 not be arranged straightly in a direction in which the distance from the contact portion increases, which makes unwanted vibration less prone to escape outward. In the example of FIG. 8, only the two outermost projections 144 are divided. In the case of the ring-shaped rigidity changing portions, forming the dividing portions 146 is effective because the peripheral length increases and elastic deformation becomes less apt to occur as the position goes outward. FIG. 8 is a plan view showing the modification and corresponds to FIG. 1A. As a further modification, plural rigidity changing portions may be dotted (dispersed). The range where the wall member 140 is apt to vibrate can be restricted even by non-ring-like rigidity changing portions, that is, non-ring-like grooves 143 (or projections 144) that are provided so as to surround the contact portion in the plane parallel with the wall member 140.

Figure 9:
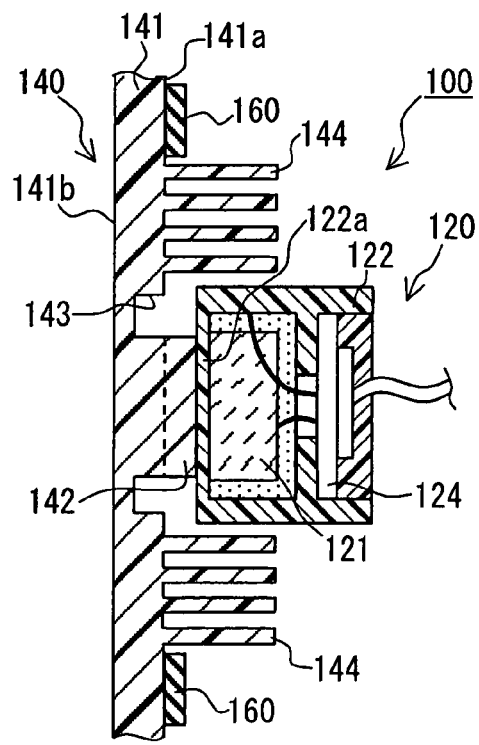
FIG. 9 is a sectional view showing another modification.

In this embodiment, the groove 143 and the projections 144 are provided as the rigidity changing portions to attenuate unwanted vibration. However, only the groove 143 or only the projections 144 may be provided. Furthermore, a configuration is possible in which, as shown in FIG. 9, a damping member 160 made of a material having a large damping coefficient than the wall member 140 is laid on the inner surface 141a of the wall member 140 in excluding the surface that is formed with the ultrasonic wave transmission portion 142. In this configuration, since the damping member 160 absorbs part of the energy of unwanted vibration, unwanted vibration that is transmitted outside the damping member 160 (away from the contact portion) can be weakened. The damping member 160 may be made of a clay-like rubber, for example. Depending on the lamination structure of the damping member 160, the wall member 140 may be given a rigidity difference between the lamination portion and the portion around it. In such a case, it is expected that the rigidity difference produces an effect that is similar to, for example, the binding effect of the projections 144. However, the damping member 160 attenuates unwanted vibration by absorbing part of the unwanted vibration by itself. Therefore, unwanted vibration can be attenuated even if the lamination portion is the same in rigidity as the portion inside (adjacent to) it. No particular limitations are imposed on the arrangement position of the damping member 160. For example, the damping member 160 may be provided inside the groove 143. However, because of a large damping coefficient and difficulty in disposing it in a narrow range, it is preferable that as shown in FIG. 9 the damping member 160 be provided outside the rigidity changing portions. FIG. 9 is a sectional view showing the modification and corresponds to FIG. 1B.

In this embodiment, the one ultrasonic wave transmission portion 142 is formed for the wall member 140. However, another configuration is possible in which plural ultrasonic wave transmission portions 142 are formed for the wall member 140 and ultrasonic waves (vibration) are transmitted via the plural ultrasonic wave transmission portions 142.

Second Embodiment

Figure 10:
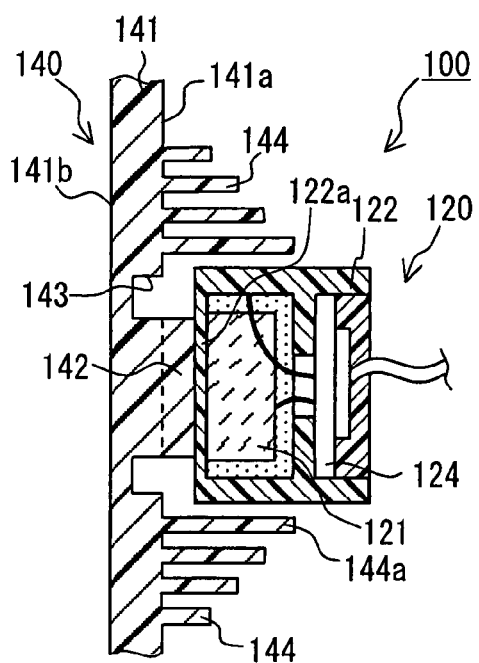
FIG. 10 is a sectional view showing a general configuration of an obstacle detecting device according to a second embodiment of the invention.

Next, a second embodiment of the invention will be described with reference to FIG. 10. FIG. 10 is a sectional view showing a general configuration of an obstacle detecting device 100 according to this embodiment and corresponds to FIG. 1B. Similar components of an obstacle detecting device of the present embodiment, which are similar to the components of the obstacle detecting device of the first embodiment, will be indicated by the same numerals.

The obstacle detecting device 100 according to the second embodiment and that according to the first embodiment have many things in common. Therefore, in the following, no detailed descriptions will be given to the common points and different points will be described mainly.

In the first embodiment, the heights of all the projections 144 are set identical. In contrast, this embodiment is characterized in that the height of at least one projection 144 is different from that of the other projections 144.

Where a material property (e.g., Young's modulus) of the wall member 140 varies with the temperature as in the case of the wall member 140 used in this embodiment which is made of a resin, the wavelength of vibration (unwanted vibration) varies with the temperature even if the voltage applied to the ultrasonic transducer 121 remains the same. For example, as the temperature decreases, Young's modulus increases and the wall member 140 becomes harder, as a result of which the wavelength of vibration (unwanted vibration) becomes longer. In view of this, in this embodiment, as shown in FIG. 10, the four projections 144 which are arranged side by side as in the first embodiment are different from each other in height. In other words, the heights of the four projections 144 are set so that they have different resonance frequencies.

In the obstacle detecting device 100 according to this embodiment, since as described above the plural projections 144 have different resonance frequencies, one of the projections 144 can attenuate unwanted vibration even if the frequency of unwanted vibration is varied by a temperature variation.

The configuration according to this embodiment can efficiently attenuate unwanted vibration (or each of plural kinds of ultrasonic waves) not only in the case where a material property of the wall member 140 varies with the temperature but also in, for example, a case that plural kinds of ultrasonic waves having different frequencies are sent and/or received.

In the example of FIG. 10, the innermost (i.e., closest to the contact portion) one is highest among the plural projections 144. In other words, the resonant length is increased as a countermeasure against temperature reduction. This configuration can attenuate unwanted vibration efficiently at the position that is close to the contact portion under a low-temperature condition which is the most severe temperature condition.

Whereas in the example of FIG. 10 the projection height decreases in order as the position goes away from the contact portion, the order of the heights of the projections 144 is not limited to that of this example.

Third Embodiment

Figure 11A:
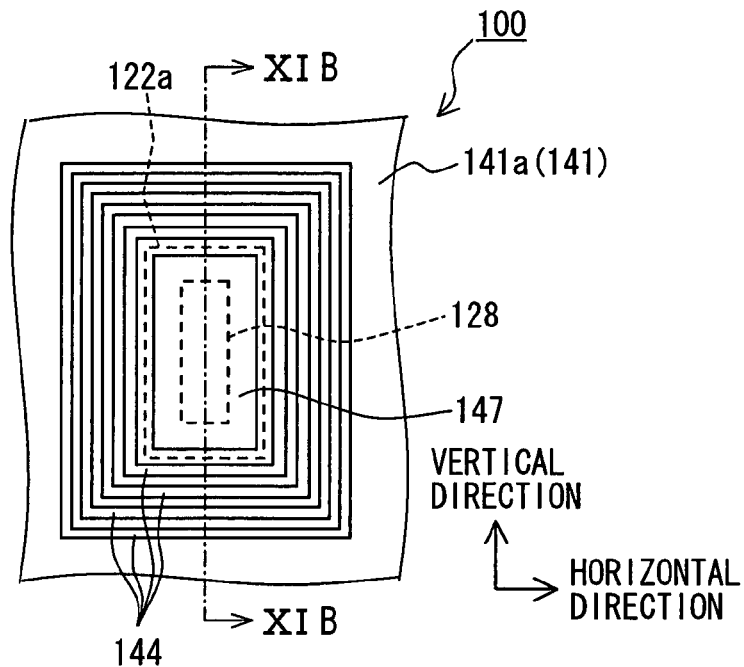
FIG. 11A is a plan view showing a general configuration of an obstacle detecting device according to a third embodiment of the invention as viewed from inside.
Figure 11B:
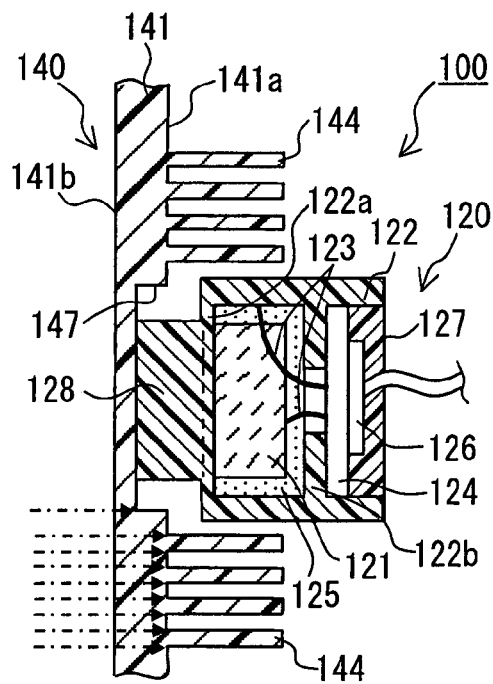
FIG. 11B is a sectional view taken along line XIB-XIB in FIG. 11A.

Next, a third embodiment of the invention will be described with reference to FIGS. 11A and 11B. Similar components of an obstacle detecting device of the present embodiment, which are similar to the components of the obstacle detecting device of the first embodiment, will be indicated by the same numerals. FIGS. 11A and 11B are a plan view as viewed from inside and a sectional view taken along line XIB-XIB in FIG. 11A, respectively, showing a general configuration of an obstacle detecting device 100 according to the third embodiment of the invention. In FIG. 11A, for the sake of convenience, only the outer periphery of the outer surface of a bottom portion 122a of a case 122 of an ultrasonic sensor 120 and the outer periphery of the contact surface of an ultrasonic wave transmission portion are indicated by a broken line. In FIG. 11B, for the sake of convenience, rigidity changing points of a wall member 140 that are located on only one side of its portion that is in contact with the ultrasonic sensor 120 are indicated by chain-line arrows.

The obstacle detecting device 100 according to the third embodiment and that according to the first embodiment have many things in common. Therefore, in the following, no detailed descriptions will be given to the common points and different points will be described mainly.

In the first embodiment, the major transmission range of ultrasonic waves (vibration) is narrowed into a predetermined range by providing the wall member 140 with the projecting ultrasonic wave transmission portion 142. In contrast, this embodiment is characterized in that the major transmission range of ultrasonic waves (vibration) is narrowed into a predetermined range by providing the case 122 (which is part of the ultrasonic sensor 120) with a projecting ultrasonic wave transmission portion. Therefore, the range of formation of the ultrasonic wave transmission portion according to this embodiment is restricted to that surface of the case 122 which is opposed to the wall member 140 (naturally, the contact surface of the ultrasonic wave transmission portion is smaller in area than and is entirely included in the imaginary outer surface of the bottom portion 122a). However, the function of the ultrasonic wave transmission portion of this embodiment is the same as the ultrasonic wave transmission portion 142 of the wall member 140 of the first embodiment.

The ultrasonic sensor 120 of this embodiment is the same in basic structure as that of the first embodiment. As shown in FIGS. 11A and 11B, the outer surface of the bottom portion 122a of the case 122 is formed with a projecting ultrasonic wave transmission portion 128 (in this embodiment, it corresponds to the term "vibratory portion of the ultrasonic sensor"). The ultrasonic sensor 120 is fixed to the wall member 140 in a state that the ultrasonic wave transmission portion 128 is in contact with the inner surface 141a of the wall member 140. Like the ultrasonic wave transmission portion 142 of the first embodiment, the ultrasonic wave transmission portion 128 of this embodiment is a column-shaped portion whose contact surface has a rectangular shape that is longer in the vertical direction (with respect to the ground) than in the horizontal direction in the plane parallel with the wall member 140. Thus, the wave transmission portion 128 has a cross sectional shape in parallel with the imaginary plane, and the shape has a first length in a first direction (i.e., vertical direction) and a second length in a second direction (i.e., horizontal direction) orthogonal to the first direction. Here, the first length is longer than the second length. And the ultrasonic wave transmission portion 128 is formed integrally with the case 122 by using the same material.

The wall member 140 of this embodiment is also the same in basic structure as that of the first embodiment. As shown in FIGS. 11A and 11B, the portion where the ultrasonic wave transmission portion 142 is formed and the groove 143 which is formed around (adjacent to) it in the first embodiment are replaced by a single groove 147. The ultrasonic wave transmission portion 128 of the ultrasonic sensor 120 is bonded and fixed to the bottom surface of the groove 147. The groove 147 is the same in depth as the groove 143 of the first embodiment; the configuration of this embodiment is such as to be obtained by replacing the ultrasonic wave transmission portion 142 and that portion of the wall member 140 which is formed with the ultrasonic wave transmission portion 142 with the ultrasonic wave transmission portion 128.

As described above, in the obstacle detecting device 100 according to this embodiment, the outer surface of the bottom portion 122a of the case 122 which is part of the ultrasonic sensor 120 is formed with the ultrasonic wave transmission portion 128. That is, ultrasonic waves (vibrations) are transmitted between the ultrasonic sensor 120 (i.e., the ultrasonic transducer 121 and the bottom portion 122a of the case 122) and the wall member 140 via the ultrasonic wave transmission portion 128. The ultrasonic wave transmission portion 128 is provided on part of the outer surface of the bottom portion 122a, and is different from the bottom portion 122a of the case 122 to which the ultrasonic transducer 121 is fixed at least in the area in the plane parallel with the wall member 140. Therefore, the major transmission range of ultrasonic waves (vibrations) can be narrowed into a predetermined range by the ultrasonic wave transmission portion 128. Furthermore, as described in the first embodiment, unwanted vibrations can be attenuated by the rigidity changing portions. Desired directivity can be secured by these effects.

Since as shown in FIG. 11B the part of the bottom surface of the groove 147 is in contact with the ultrasonic wave transmission portion 128, the rigidity changing point that is closest to the contact portion is the side surface of the groove 147. However, the rigidity changing portion that is closest to the contact portion is that portion of the base member 141 which is located between the groove 147 and the innermost projection 144 (i.e., that portion of the base member 141 which is adjacent to the groove 147). And the bottom wall of the groove 147 which includes the contact portion is apt to vibrate with the above rigidity changing portion as a binding portion. Therefore, the unwanted vibration attenuation effect is substantially the same as with the structure of the first embodiment (see FIGS. 1A and 1B).

In this embodiment, the ultrasonic wave transmission portion 128 is formed integrally with the case 122 by using the same material (integral molding or forming). Therefore, the reflection loss can be reduced that occurs at the boundary between different materials due to a difference in acoustic impedance. However, another configuration is possible in which the ultrasonic wave transmission portion 128 is not formed integrally with the case 122 or it is formed with a different material than the case 122.

In this embodiment, the shape of the contact surface of the ultrasonic wave transmission portion 128 that is in contact with the inner surface 141a of the wall member 140 is the same as the shape of the bottom portion 122a of the case 122 in the plane parallel with the wall member 140. However, the shape of the contact surface of the ultrasonic wave transmission portion 128, as well as its area, may be set arbitrarily according to a desired detection area and the transmission/reception frequency of ultrasonic waves.

In this embodiment, the one ultrasonic wave transmission portion 128 is formed for the case 122. However, another configuration is possible in which plural ultrasonic wave transmission portions 128 are formed for the case 122 and ultrasonic waves (vibration) are transmitted via the plural ultrasonic wave transmission portions 128.

Figure 12:
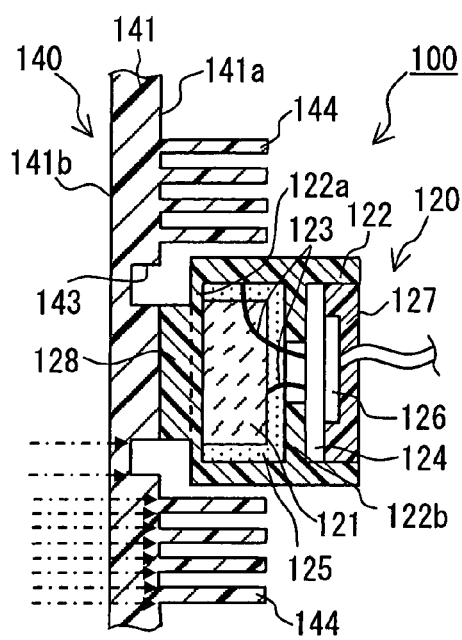
FIG. 12 is a sectional view showing a modification.

In this embodiment, the ultrasonic wave transmission portion 128 of the ultrasonic sensor 120 is in contact with the bottom surface of the groove 147. However, another configuration is possible in which, as shown in FIG. 12, a ring-like groove 143 is formed adjacent to the contact portion in the same manner as in the first embodiment and the ultrasonic wave transmission portion 128 of the ultrasonic sensor 120 is in contact with that portion of the base member 141 which is enclosed by the groove 143 (i.e., the corresponding portion, excluding the projecting ultrasonic wave transmission portion 142, of the base member 141 of the first embodiment). This configuration is also expected to provide the same advantages as the above-described configuration. FIG. 12 is a sectional view showing the modification and corresponds to FIG. 11B.

The configuration according to this embodiment can be combined with any of the configurations according to the modifications (see FIGS. 7-9) of the first embodiment and the configuration according to the second embodiment.

Fourth Embodiment

Figure 13A:
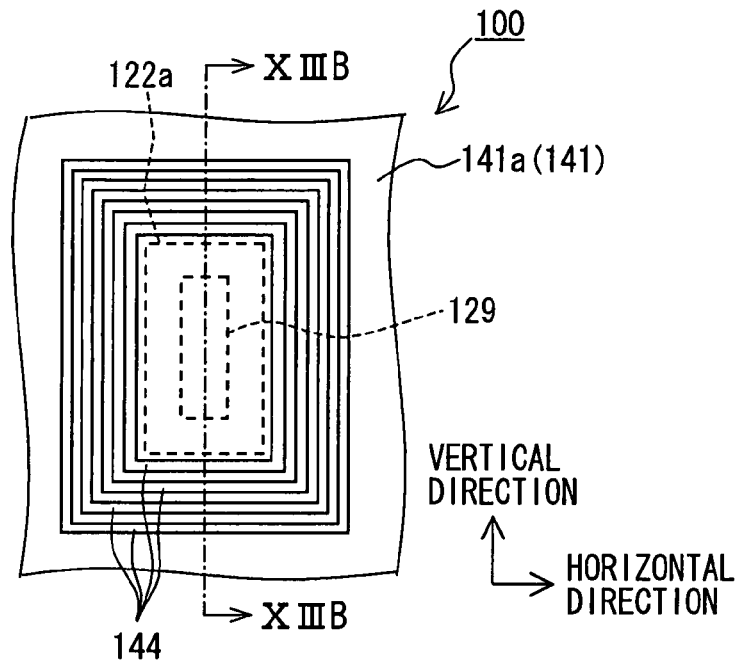
FIG. 13A is a plan view showing a general configuration of an obstacle detecting device according to a fourth embodiment of the invention as viewed from inside.
Figure 13B:
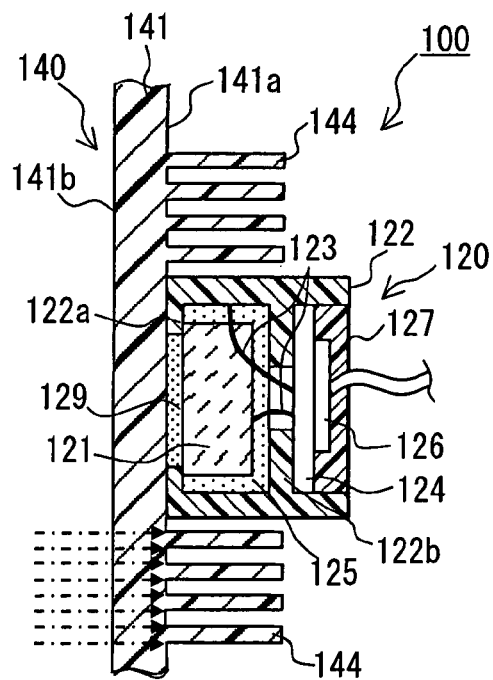
FIG. 13B is a sectional view taken along line XIIIB-XIIIB in FIG. 13A.

Next, a fourth embodiment of the invention will be described with reference to FIGS. 13A and 13B. FIGS. 13A and 13B are a plan view as viewed from inside and a sectional view taken along line XIIIB-XIIIB in FIG. 13A, respectively, showing a general configuration of an obstacle detecting device 100 according to this embodiment. In FIG. 13A, for the sake of convenience, only the outer periphery of the outer surface of a bottom portion 122a of a case 122 of an ultrasonic sensor 120 and the outer periphery of the contact surface of an ultrasonic wave transmission portion are indicated by broken lines. In FIG. 13B, for the sake of convenience, rigidity changing points of a wall member 140 that are located on only one side of its portion that is in contact with the ultrasonic sensor 120 are indicated by chain-line arrows.

The obstacle detecting device 100 according to the fourth embodiment and that according to the third embodiment have many things in common. Therefore, in the following, no detailed descriptions will be given to the common points and different points will be described mainly.

In the third embodiment, the major transmission range of ultrasonic waves (vibrations) is narrowed into a predetermined range by providing the projecting ultrasonic wave transmission portion 128 on the outer surface of the bottom portion 122a of the case 122 which is part of the ultrasonic sensor 120. That is, the third embodiment is such that the shape of the ultrasonic wave transmission portion is a dominant factor in narrowing the major transmission range of ultrasonic waves (vibrations) into a predetermined range. In contrast, this embodiment is characterized in that an ultrasonic wave transmission portion made of a material that is intermediate in acoustic impedance between the wall member 140 (base member 141) and the ultrasonic transducer 121 is disposed inside the bottom portion 122a of the case 122 so as to be in contact with the wall member 140 and the ultrasonic transducer 121. That is, this embodiment is such that the material of the ultrasonic wave transmission portion is a dominant factor in narrowing the major transmission range.

More specifically, as shown in FIGS. 13A and 13B, an ultrasonic wave transmission portion 129 made of a material (e.g., resin) that is different from the material of the case 122 is disposed at the center of the bottom portion 122a so as to be in contact with both of the wall member 140 and the ultrasonic transducer 121. The concept that the material of the ultrasonic wave transmission portion 129 is different from that of the case 122 means not only a literal case that the material (resin) of the ultrasonic wave transmission portion 129 is different from the material (resin) of the case 122 but also a case that one contains glass cloth and the other does not whereas their basic resin materials are the same.

The material, shape, etc. of the ultrasonic wave transmission portion 129 are set so that its acoustic impedance is approximately at the middle of the acoustic impedance of the ultrasonic transducer 121 and that of the wall member 140 and the ultrasonic sensor 120 exhibits desired directivity.

Ultrasonic waves have a characteristic that the amount of waves that do not pass through the boundary between two members having different acoustic impedances (i.e., the amount of reflected waves) increases as the difference between the acoustic impedances increases. As mentioned above, the acoustic impedance of the ultrasonic wave transmission portion 129 is approximately at the middle of the acoustic impedance of the ultrasonic transducer 121 and that of the wall member 140. Therefore, the amount of ultrasonic waves reflected between the ultrasonic transducer 121 and the ultrasonic wave transmission portion 129 and that of ultrasonic waves reflected between the ultrasonic wave transmission portion 129 and the wall member 140 can be reduced efficiently and the amount of transmitted ultrasonic waves can thereby be increased.

On the other hand, the case 122 should satisfy such characteristics as rigidity to allow the ultrasonic transducer 121 etc. to be fixed to it or to allow itself to be attached to the wall member 140. For this reason, it is very difficult to employ, as the material of the case 122, a material that is most suitable for transmission of ultrasonic waves. As a result, the acoustic impedance of the bottom portion 122a which is located around the ultrasonic wave transmission portion 129 and is made of the same material as the other portion of the case 122 goes out of the range between the acoustic impedance of the ultrasonic transducer 121 and that of the wall member 140 or becomes close to one of the acoustic impedance of the ultrasonic transducer 121 and that of the wall member 140 even if it falls within that range. As a result, the amount of ultrasonic waves reflected by the bottom portion 122a which is made of the same material as the other portion of the case 122 becomes larger than that of ultrasonic waves reflected by the ultrasonic wave transmission portion 129. That is, the amount of ultrasonic waves transmitted by the bottom portion 122a is smaller than that of ultrasonic waves transmitted by the ultrasonic wave transmission portion 129.

Therefore, during sending or reception of ultrasonic waves by the ultrasonic transducer 121, the ultrasonic waves are mainly transmitted by the ultrasonic wave transmission portion 129 (only a minor part of the ultrasonic waves are transmitted by the bottom portion 122a of the case 122). As a result, the major transmission range of ultrasonic waves in the wall member 140 can be made as narrow as the range corresponding to the ultrasonic wave transmission portion 129.

Also in this embodiment, as in the third embodiment, the inner surface 141a, excluding the contact surface, of the wall member 140 is formed with rigidity changing portions. More specifically, as shown in FIGS. 13A and 13B, plural projections 144 are provided in the same manner as in the first embodiment and the contact surface of the ultrasonic sensor 120, that is, the outer surface of the bottom portion 122a of the case 122 and the outer surface of the ultrasonic wave transmission portion 129, is bonded and fixed to a flat portion of the base member 141 that is located inside the plural projections 144 and in which neither the groove 143 nor the ultrasonic wave transmission portion 142 is provided. Therefore, unwanted vibration can be attenuated by the binding effect and the elastic deformation effect of the projections 144.

As described above, according to the obstacle detecting device 100 according to this embodiment, desired directivity can be secured by the effect of the ultrasonic wave transmission portion 129 and the effects of the rigidity changing portions.

Also in this embodiment, as shown in FIG. 13A, in the plane parallel with the wall member 140, the contact surface of the ultrasonic wave transmission portion 129 has a rectangular shape that is longer in the vertical direction (with respect to the ground) than in the horizontal direction and each rigidity changing portion is shaped so as to be parallel with the outer periphery of the ultrasonic wave transmission portion 129. Therefore, the obstacle detecting device 100 according to this embodiment can suitably used as a vehicular obstacle detecting device.

Figure 14:
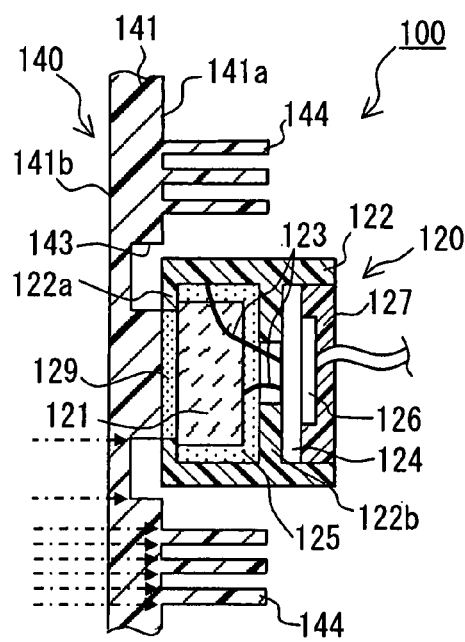
FIG. 14 is a sectional view showing a modification.

The rigidity changing portions can be provided on the inner surface of the wall member 140 excluding the portion that is in contact with the vibratory portion (in this embodiment, the ultrasonic wave transmission portion 129) of the ultrasonic sensor 120. For example, as shown in FIG. 14, a groove 143 may be provided adjacent to the outer periphery of the contact portion. In this configuration, by virtue of the effect of the groove 143, the portion that is apt to vibrate can be narrowed and unwanted vibration can be attenuated further. Furthermore, since the bottom portion 122a which is located outside the ultrasonic wave transmission portion 129 is not in contact with the wall member 140, no unwanted vibration is transmitted by the bottom portion 122a, whereby desired directivity can be obtained. However, in this configuration, the area of bonding between the ultrasonic sensor 120 and the wall member 140 is smaller than in the configuration of FIGS. 13A and 13B. It is therefore preferable to employ the structure according to the modification of the first embodiment shown in FIG. 7. FIG. 14 is a sectional view showing the modification and corresponds to FIG. 13B.

Figure 15:
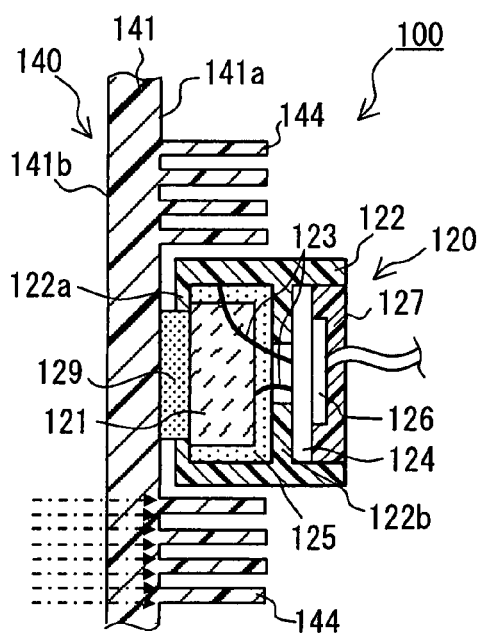
FIG. 15 is a sectional view showing another modification.

In this embodiment, the outer surface of the ultrasonic wave transmission portion 129 is flush with that of the bottom surface 122a of the case 122. Alternatively, as shown in FIG. 15, part of the ultrasonic wave transmission portion 129 may project from the outer surface of the bottom portion 122a, as a result of which only the ultrasonic wave transmission portion 129 is in contact with the wall member 140. In this case, the bottom portion 122a which is located outside the ultrasonic wave transmission portion 129 is not in contact with the wall member 140 and hence no unwanted vibration is transmitted by the bottom portion 122a. FIG. 15 is a sectional view showing the modification and corresponds to FIG. 13B. The groove 143 that is provided adjacent to the outer periphery of the contact portion as shown in FIG. 14 may be provided in the configuration of FIG. 15. In this configuration, unwanted vibration can be attenuated further. However, also in this configuration, as in the configuration of FIG. 14, the area of bonding between the ultrasonic sensor 120 and the wall member 140 is smaller than in the configuration of FIGS. 13A and 13B. It is therefore preferable to employ the structure according to the modification of the first embodiment shown in FIG. 7.

The configuration according to this embodiment can be combined with any of the configurations according to the modifications of the first embodiment (see FIGS. 7-9) and the configuration according to the second embodiment.

Although the preferred embodiments of the invention have been described above, the invention is in no way limited to those embodiments. And various modifications are possible without departing from the spirit and scope of the invention.

The structures of the rigidity changing portions according to the embodiments are just examples. Any structures can be employed as long as plural rigidity changing portions are provided on the inner surface 141a of the wall member 140 excluding the surface of contact with the vibratory portion of the ultrasonic sensor 120 so as to be arranged in the direction away from the contact portion.

Figure 16:
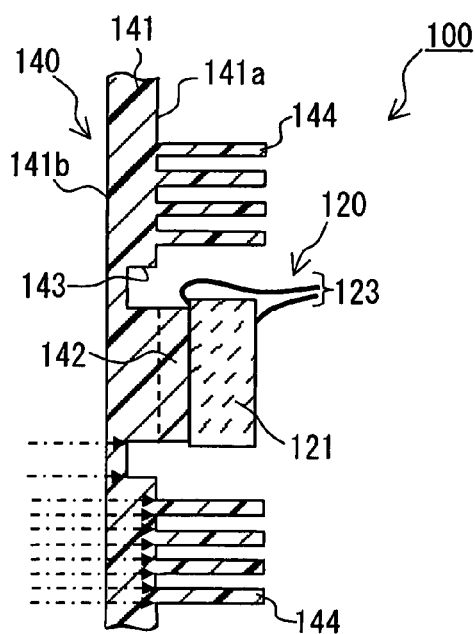
FIG. 16 is a sectional view showing still another modification.

In the embodiments, the ultrasonic sensors 120 are such that the ultrasonic transducer 121 is housed in the case 122. However, for example, as shown in FIG. 16, a configuration is possible in which the ultrasonic transducer 121 is not housed in the case 122 and is in direct contact with the wall member 140. Also in this configuration, the structures according to the first embodiment and its modifications and the structure according to the second embodiment can be employed. FIG. 16 shows a case that the structure according to the first embodiment shown in FIGS. 1A and 1B is employed. FIG. 16 is a sectional view showing the modification and corresponds to FIG. 1B.

Figure 17A:
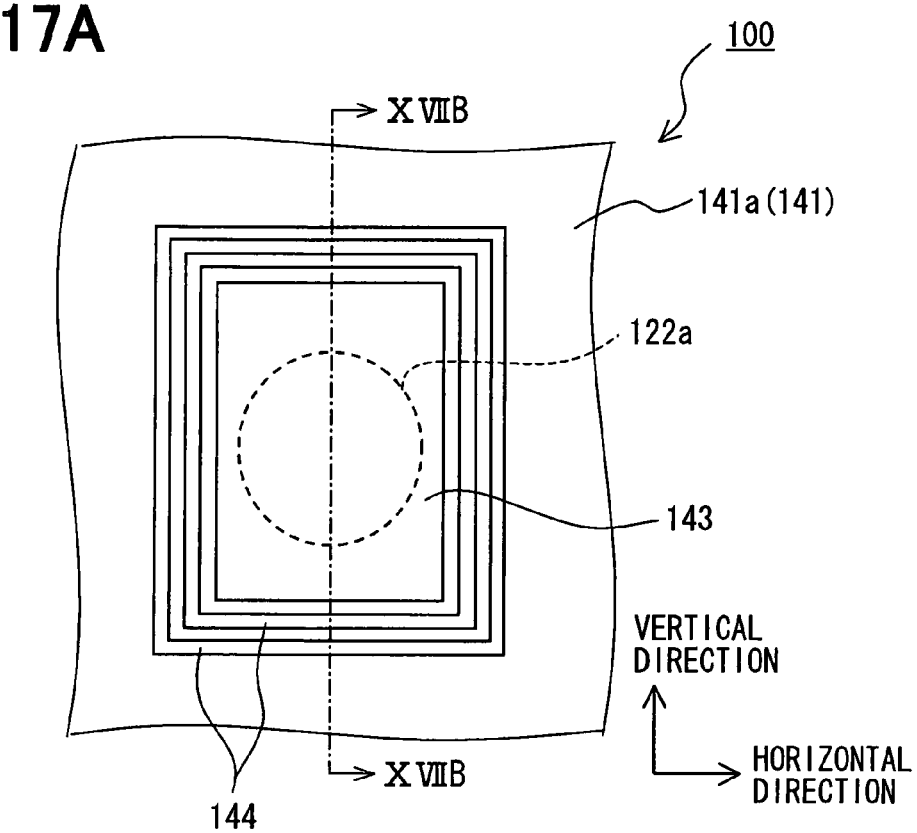
FIG. 17A is a plan view showing a further modification as viewed from inside.
Figure 17B:
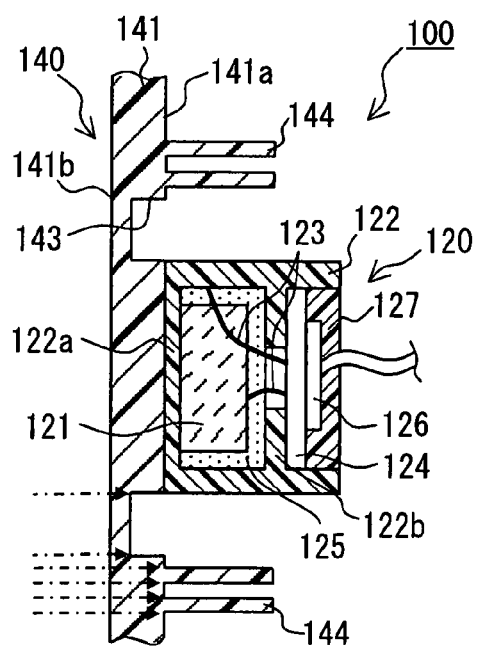
FIG. 17B is a sectional view taken along line XVIIB-XVIIB in FIG. 17A.

In the embodiments, the shapes of the rigidity changing portions are made correspondingly to the outer peripheral shape (e.g., cross sectional shape) of the vibratory portion of the ultrasonic sensor 120 in the plane parallel with the wall member 140. However, for example, as shown in FIGS. 17A and 17B, the shapes of rigidity changing portions may be made different from the outer periphery shape of the vibratory portion of an ultrasonic sensor 120 in a plane that is parallel with a wall member 140. In the configuration of FIGS. 17A and 17B, the outer surface of the bottom portion 122a (the vibratory portion of the ultrasonic sensor 120) of a case 122 is circular in a plan view and the outside surface of a groove 143 which is formed adjacent to the contact portion that is in contact with the outer surface of the bottom portion 122a has a rectangular shape that is longer in the vertical direction (with respect to the ground) than in the horizontal direction in the plane parallel with the wall member 140. Projections 144 also have a rectangular shape like the outside surface of the groove 143 in the plane parallel with the wall member 140. Even in this configuration in which the wall member 140 or the ultrasonic sensor 120 is not provided with the ultrasonic wave transmission portion 142, 128, or 129 for narrowing the major transmission range of ultrasonic waves, desired directivity can be obtained by attenuating unwanted vibration while defining the range where vibration is apt to occur by means of only the rigidity changing portions. FIGS. 17A and 17B are a plan view as viewed from inside and a sectional view taken along line XVIIB-XVIIB in FIG. 17A, respectively, showing the modification. Although in FIGS. 17A and 17B the ultrasonic sensor 120 is such that the ultrasonic transducer 121 is housed in the case 122, the same concept can be applied to the ultrasonic sensor 120 of FIG. 16 in which the ultrasonic transducer 121 is not housed in the case 122 and is in direct contact with the wall member 140.

In the embodiments, ultrasonic waves are sent and/or received by the single ultrasonic transducer 121. However, a vibrator for sending ultrasonic waves and a vibrator for receiving ultrasonic waves may be provided separately.

In the embodiments, the circuit board 124 etc. are housed in the case 122 together with the ultrasonic transducer 121. However, satisfactory results are obtained as long as at least the ultrasonic transducer 121 is housed in the case 122.

In the embodiments, the wall member 140 is a bumper of a vehicle and the obstacle detecting device 100 is a vehicular obstacle detecting device. However, as mentioned above, the wall member 140 may be a member other than a bumper, such as a vehicle body or a member that is not a vehicle component.

Additional advantages and modifications will readily occur to those skilled in the art. The invention in its broader terms is therefore not limited to the specific details, representative apparatus, and illustrative examples shown and described.

What is claimed is:

1. An obstacle detecting device comprising:
    a wall member that has a base member having an inner surface, the base member extending in parallel with an imaginary plane; and
    an ultrasonic sensor that is attached to the inner surface of the base member for transmitting and receiving an ultrasonic wave via the base member, the ultrasonic sensor including an ultrasonic transducer, the ultrasonic sensor being in contact with the base member via a contact portion of the inner surface of the base member, wherein:
    the wall member includes a plurality of rigidity changing portions that are arranged on an other part of the inner surface other than the contact portion in an arrangement direction away from the contact portion.

2. The obstacle detecting device according to claim 1, wherein:
    the ultrasonic sensor includes a case that houses the ultrasonic transducer, the case having a bottom portion;
    the bottom portion has a first surface that is in contact with the ultrasonic transducer and is fixed to ultrasonic transducer; and
    the bottom portion has a second surface that is in contact with the wall member, the second surface being located on an opposite side of the bottom portion opposite the first surface.

3. The obstacle detecting device according to claim 1, wherein the ultrasonic transducer is in contact with the wall member.

4. The obstacle detecting device according to claim 2, further comprising:
    a wave transmission portion that projects from a part of the second surface of the bottom portion, wherein:
    the wave transmission portion is in contact with the wall member.

5. The obstacle detecting device according to claim 4, wherein the wave transmission portion has a contact surface that is in contact with the bottom portion, the contact surface of the wave transmission portion having a shape in parallel with the imaginary plane different from a shape of the bottom portion.

6. The obstacle detecting device according to claim 2, further comprising a wave transmission portion that projects from the wall member, the wave transmission portion being in contact with the ultrasonic sensor, wherein the wave transmission portion has a contact surface different in at least one of a shape and an area from that of the ultrasonic sensor.

7. The obstacle detecting device according to claim 2, further comprising:
    a wave transmission portion that is provided to a part of the bottom portion of the case, the wave transmission portion being in contact with the wall member and with the ultrasonic transducer, the wave transmission portion made of a material having an acoustic impedance that ranges generally at a middle between an acoustic impedance of the wall member and an acoustic impedance of the ultrasonic transducer, wherein the ultrasonic wave is transmitted via the wave transmission portion and the wall member.

8. The obstacle detecting device according to claim 7, wherein the acoustic impedance of the wave transmission portion is closer to an a median value between the acoustic impedance of the ultrasonic transducer and the acoustic impedance of the wall member closer than an acoustic impedance of an other part of the bottom portion of the case, the other part being located around the wave transmission portion.

9. The obstacle detecting device according to claim 4, wherein:
    the wave transmission portion has a shape in parallel with the imaginary plane, the shape having a first length in a first direction and a second length in a second direction orthogonal to the first direction, the first length being different from the second length.

10. The obstacle detecting device according to claim 1, wherein the plurality of rigidity changing portions includes a groove provided to the other part of the inner surface.

11. The obstacle detecting device according to claim 10, wherein;
    the groove is provided adjacent to an outer periphery of the contact portion; and
    the groove is recessed relative to the contact portion of the inner surface.

12. The obstacle detecting device according to claim 1, wherein the plurality of rigidity changing portions includes a projection provided to the other part of the inner surface.

13. The obstacle detecting device according to claim 12, wherein the projection is one of a plurality of projections.

14. The obstacle detecting device according to claim 13, wherein each of the plurality of projections is arranged adjacent to each other in the arrangement direction.

15. The obstacle detecting device according to claim 13, wherein:
    at least one of the plurality of projections has a first length in a perpendicular direction to the imaginary plane;
    another one of the plurality of projections has a second length in the perpendicular direction; and
    the first length is different from the second length.

16. The obstacle detecting device according to claim 12, wherein:
    the projection has a length in a perpendicular direction to the imaginary plane;
    the base member has a part, on which the projection is provided, the part of the base member having a length in the perpendicular direction; and
    the length of the projection is equal to or larger than the length of the part of the base member.

17. The obstacle detecting device according to claim 12, wherein:

the projection has a length in the arrangement direction;

the base member has a part, on which the projection is provided, the part of the base member having a length in a perpendicular direction to the imaginary plane; and the length of the projection in the arrangement direction is equal to or less than the length of the part of the base member in the perpendicular direction.

18. The obstacle detecting device according to claim 12, wherein at least one projection is provided integrally with the wall member by a material identical to that of the wall member.

19. The obstacle detecting device according to claim 1, wherein at least one of the plurality of rigidity changing portions has a ring shape and is provided to surround the contact portion.

20. The obstacle detecting device according to claim 19, wherein the at least one of the plurality of rigidity changing portions is provided along an outer peripheral shape of the contact portion.

21. The obstacle detecting device according to claim 19, wherein the at least one of the plurality of rigidity changing portions is located closest to the contact portion.

22. The obstacle detecting device according to claim 21, wherein the at least one of the plurality of rigidity changing portions is provided adjacent to an outer periphery of the contact portion.

23. The obstacle detecting device according to claim 19, wherein:

each of the plurality of rigidity changing portions is provided concentrically relative to the contact portion; and the contact portion is surrounded by each of the plurality of rigidity changing portions.

24. The obstacle detecting device according to claim 19, wherein each of the plurality of rigidity changing portions has the ring shape.

25. The obstacle detecting device according to claim 1, the device further comprising a damping member that is provided to the other part of the inner surface, the damping member being made of a material having a damping coefficient larger than that of the wall member.

26. The obstacle detecting device according to claim 25, wherein the damping member is arranged on a side of the plurality of rigidity changing portions in the arrangement direction.

27. The obstacle detecting device according to claim 1, wherein each of the plurality of rigidity changing portions is configured to cause a rigidity of a corresponding part of the base member to be different from a rigidity of the base member, the corresponding part being located on an opposite side of each of the plurality of rigidity changing portions opposite the arrangement direction.

28. The obstacle detecting device according to claim 4, further comprising a wave transmission portion that projects from the wall member, the wave transmission portion being in contact with the ultrasonic sensor, wherein the wave transmission portion has a contact surface different in at least one of a shape and an area from that of the ultrasonic sensor.

29. The obstacle detecting device according to claim 4, further comprising:

a wave transmission portion that is provided to a part of the bottom portion of the case, the wave transmission portion being in contact with the wall member and with the ultrasonic transducer, the wave transmission portion made of a material having an acoustic impedance that ranges generally at a middle between an acoustic impedance of the wall member and an acoustic impedance of the ultrasonic transducer, wherein the ultrasonic wave is transmitted via the wave transmission portion and the wall member.

30. The obstacle detecting device according to claim 28, wherein:

the wave transmission portion has a shape in parallel with the imaginary plane, the shape having a first length in a first direction and a second length in a second direction orthogonal to the first direction, the first length being different from the second length.

31. The obstacle detecting device according to claim 29, wherein:

the wave transmission portion has a shape in parallel with the imaginary plane, the shape having a first length in a first direction and a second length in a second direction orthogonal to the first direction, the first length being different from the second length.

32. An obstacle detecting device comprising:

a wall member that has a base member having an inner surface, the base member extending in parallel with an imaginary plane; and an ultrasonic sensor that is attached to the inner surface of the base member for transmitting and receiving an ultrasonic wave via the base member, the ultrasonic sensor having a vibratory portion that is in contact with a contact portion of the inner surface of the base member, wherein:

the wall member includes a plurality of rigidity changing portions that are arranged on an other part of the inner surface other than the contact portion in an arrangement direction away from the contact portion.

33. The obstacle detecting device according to claim 32, wherein:

the vibratory portion of the ultrasonic sensor includes an ultrasonic transducer and a case that houses the ultrasonic transducer, the case having a bottom portion; and the ultrasonic transducer is in contact with the base member via the bottom portion.

34. The obstacle detecting device according to claim 32, further comprising:

a wave transmission portion that projects from the contact portion of the inner surface of the base member, the wave transmission portion being in contact with the ultrasonic sensor.

35. The obstacle detecting device according to claim 33, further comprising:

a wave transmission portion that projects from a part of the bottom portion of the case, the wave transmission portion being in contact with the contact portion of the inner surface of the base member.

36. The obstacle detecting device according to claim 32, wherein the plurality of rigidity changing portions includes a groove recessed in the base member in a perpendicular direction to the imaginary plane, the groove having a ring shape on the imaginary plane to surround the contact portion of the inner surface.

37. The obstacle detecting device according to claim 32, wherein the plurality of rigidity changing portions includes a projection that projects from the other part of the inner surface in a direction perpendicular to the imaginary plane.

* * * * *